United States Patent
Kjaergaard et al.

(10) Patent No.: US 11,505,918 B2
(45) Date of Patent: Nov. 22, 2022

(54) SYSTEM FOR REMAPPING A CONTROL SIGNAL FOR EXCAVATOR ARM MOVEMENT TO A ROTATORY DEGREE OF FREEDOM OF A TOOL

(71) Applicant: HEXAGON TECHNOLOGY CENTER GMBH, Heerbrugg (CH)

(72) Inventors: Lars Kjaergaard, Odense (DK); Sean Costello, Altstätten (CH); Anders Lindskov, Ebberup (DK)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 467 days.

(21) Appl. No.: 16/838,607

(22) Filed: Apr. 2, 2020

(65) Prior Publication Data

US 2020/0318316 A1 Oct. 8, 2020

(30) Foreign Application Priority Data

Apr. 2, 2019 (EP) .................................... 19166908

(51) Int. Cl.
*E02F 9/20* (2006.01)
*E02F 3/43* (2006.01)
*E02F 9/26* (2006.01)

(52) U.S. Cl.
CPC ............ *E02F 9/2037* (2013.01); *E02F 3/439* (2013.01); *E02F 9/265* (2013.01)

(58) Field of Classification Search
CPC ....... E02F 9/2037; E02F 9/265; E02F 9/2012; E02F 3/439; E02F 3/435; E02F 3/3681; G05B 19/106; G05B 19/18
See application file for complete search history.

(56) References Cited

U.S. PATENT DOCUMENTS

| 2004/0267404 | A1* | 12/2004 | Danko ................... E02F 3/437 |
| | | | 700/245 |
| 2005/0097787 | A1 | 5/2005 | Meyeres et al. |

(Continued)

FOREIGN PATENT DOCUMENTS

| CN | 1651666 A | 8/2005 |
| CN | 104164896 A | 11/2014 |

(Continued)

OTHER PUBLICATIONS

European Search Report dated Oct. 22, 2019 as received in Application No. 19166908.4.

*Primary Examiner* — Russell Frejd
(74) *Attorney, Agent, or Firm* — Maschoff Brennan

(57) ABSTRACT

A system for controlling movement of multiple links of an excavator can move a tool at the end of an excavator arm. The system includes a sensor data interface configured to receive sensor data for determining relative orientations of the multiple links with respect to each other, and a surface setting unit configured to access design data defining a reference surface. The system has a remapping unit configured to remap a user command for moving two links with respect to each other about a corresponding joint to a rotatory tool degree of freedom. The system then coordinates output signals, such that as a function of the remapped user command the tool is rotated within the associated rotatory tool degree of freedom, without the need that an operator coordinates underlying joint movements.

16 Claims, 6 Drawing Sheets

(56) References Cited

U.S. PATENT DOCUMENTS

| | | | |
|---|---|---|---|
| 2006/0064221 A1 | 3/2006 | Sporer et al. | |
| 2009/0099738 A1* | 4/2009 | Danko | E02F 9/2041 |
| | | | 701/50 |
| 2009/0204259 A1* | 8/2009 | Danko | G05B 13/024 |
| | | | 700/250 |
| 2012/0165962 A1 | 6/2012 | Faivre | |
| 2012/0239199 A1* | 9/2012 | Danko | E02F 3/439 |
| | | | 700/264 |
| 2014/0107841 A1* | 4/2014 | Danko | B25J 9/1651 |
| | | | 700/253 |
| 2018/0030693 A1 | 2/2018 | Padilla | |

FOREIGN PATENT DOCUMENTS

| | | |
|---|---|---|
| CN | 107882103 A | 4/2018 |
| EP | 2980317 A1 | 2/2016 |

\* cited by examiner

SYSTEM FOR REMAPPING A CONTROL SIGNAL FOR EXCAVATOR ARM MOVEMENT TO A ROTATORY DEGREE OF FREEDOM OF A TOOL

CROSS-REFERENCE TO RELATED APPLICATIONS

This application claims priority to European Patent Application No. 19166908.4 filed on Apr. 2, 2019, which is incorporated herein by reference.

FIELD OF THE INVENTION

The present invention relates to a system for controlling movement of multiple links of an excavator in order to move a tool arranged at the end of an excavator arm, wherein an operator of the excavator can directly adjust the position and particularly the orientation of the tool relative to a reference surface, without needing to coordinate underlying joint movements.

BACKGROUND

Excavators are construction machinery comprising a boom, a stick (also called dipper), a tool, e.g. a bucket, and a cab (also called house) on a rotating platform. The cab is typically rotatable about 360 degrees and arranged on a movable undercarriage having tracks or wheels, wherein the boom and the stick form a movable excavator arm carrying the tool. These machines are used in many ways, e.g. for digging, landscaping, material handling, brush cutting, e.g. with hydraulic saw and mower attachments, forestry work, demolition, e.g. with hydraulic claw, cutter, and breaker attachments, mining, driving piles, in conjunction with a pile driver, drilling, e.g. using an auger or hydraulic drill attachment, and snow removal, e.g. with snowplow and snow blower attachments.

For example, movement and functions of the excavator may be accomplished through the use of hydraulic cylinders and hydraulic motors. Such hydraulic excavators come in a wide variety of sizes. By way of another example, cable-operated excavators use winches and steel ropes to accomplish the movements.

Typical excavators share a basic setup, wherein the section of the excavator arm closest to the cab is referred to as the (main) boom, while the section which carries the tool is referred to as the stick (also referred to as the dipper or the dipper-stick).

The (main) boom attaches to the cab, and can be one of several different configurations, e.g. a mono boom allowing no movement apart from straight up and down, or a knuckle boom articulating at the so-called "knuckle" near the middle, letting it fold back like a finger. Another option is a hinge at the base of the boom allowing it to pivot independent to the house, e.g. up to 180 degrees. However, the latter is generally available only to compact excavators. Further, somewhat specialized configurations are known, e.g. triple-articulated booms.

Attached to the end of the boom is the stick, wherein stick length varies, e.g. depending whether reach (longer stick) or break-out power (shorter stick) is required. For example, the stick length may also be hydraulically adjustable.

The tool is attached on the end of the stick, e.g. the tool being a bucket coming in a variety of sizes and shapes. For example, a wide, large capacity (mud) bucket with a straight cutting edge is used for cleanup and levelling. In particular, a straight cutting edge is typically used for soft material to be dug, wherein for harder material the cutting edge is formed by a row of teeth. By way of another example, a general purpose bucket is generally smaller, stronger, and has hardened side cutters and teeth used to break through hard ground and rocks. There are also many other attachments which are available to be attached to the excavator, e.g. for boring, ripping, crushing, cutting, lifting, etc.

Typically, the tool is attached to the stick via a tool joint allowing at least a swiveling of the tool with respect to the stick in a pitch direction, typically up and down. Often also a swiveling in a tilt direction is possible, e.g. left and right.

A special excavator type further features a so-called tilt-rotator arrangement (also referred to as "tilt-rotator") between the end of the stick and the tool in order to increase the flexibility and precision of the excavator. For example, such tilt-rotator excavators are often used in the countries of Scandinavia.

A tilt-rotator can best be described as a wrist between the stick and the tool, allowing the tool to rotate—typically by 360 degrees—about a rotor axis, wherein the tool can further be swiveled, e.g. in each case up to ±45 degrees, about a pitch axis perpendicular to the rotor axis, and a tilt axis perpendicular to the rotor axis and the pitch axis.

In order to move the excavator and to position the tool, many types of control arrangements are known, typically comprising two x-y joysticks providing at least four main excavator movement controls by the x-y joystick movements and possibly further controls via additional buttons and/or rollers. There are different conventions worldwide for the standard joystick mapping—but they always map each joystick movement to a cylinder or joint movement. This allows a skilled operator to control movement of different excavator arm elements simultaneously.

For example, in the US often the SAE controls configuration is used, while in other parts of the world the ISO control configuration is more common. Some manufacturers also have switches that allow the operator to select which control configuration to use.

Operating an excavator arm quickly and precisely is a highly skilled task, as each hand-operated control input causes movement of one specific joint. To achieve a desired linear or angular motion of the tool at the end of the arm, an operator must coordinate all the individual joint movements. This becomes particularly difficult if the excavator arm includes a tilt-rotator arrangement.

For repetitive complex movements excavators from prior art therefore have automated control functionalities, e.g. wherein an operator can generate movement profiles for preset selectable trajectories, i.e. time series of positions, using inverse kinematics.

It is also known to implement a remapping of the standard excavator controls, which map each control input to a cylinder or joint movement, onto a linear degree of freedom for the movement of a reference point at the end of the stick. Such basic remapping is a relatively straightforward extrapolation of how a standard excavator works. For example, only the movement of the cab rotation and the first two arm links (boom and stick) must be remapped.

Further it is known to have functionalities to specify a particular direction, speed, or tool angle relative to the direction of motion of the tool in order to facilitate the operator's task.

However, prior art support and remapping functionalities typically cause a situation-dependent interruption between a normal operation, i.e. a manual control of individual cylinder or joint movements, and the aided automatic operation. For example, a high-level of skill is required to assess a current situation at the end of or during an automated movement, i.e. the impact of the current excavator arm and tool position on the tool movement commanded by the normal operation of the manual controls. Therefore, even for an expert operator it is difficult to seamlessly take over manual control of the tool movement at the end of the aided functionality or during the aided functionality, e.g. to make on-the-fly adjustments.

SUMMARY

In some embodiments, a simplified control of an excavator arm is provided, particularly for the interplay between manual and automatic control of the excavator arm.

At least parts of the embodiments are achieved by realizing the features of the independent claims. Features which further develop the invention in an alternative or advantageous manner are described in the dependent patent claims.

In some embodiments, the invention relates to a system for controlling movement of multiple links of an excavator in order to move a tool arranged at the end of an excavator arm, particularly wherein the tool is attached to a tilt-rotator arrangement. The system comprises an input interface configured to receive input signals carrying user commands for moving at least part of the multiple links with respect to each other about corresponding joints, and an output interface configured to provide output signals for multiple actuators controlling the movement of the multiple links.

For example, the input signals are provided by various excavator user-input devices, e.g. two x-y joysticks and particularly further buttons and/or rollers, wherein each controller movement and/or activation is mapped to a cylinder or joint movement in order to control different movements of the cab, the boom, the stick, and the tool with respect to one another. Thus, in case of a hydraulic excavator the output signal may be a control signal for a hydraulic cylinder.

In some embodiments, the system further comprises a sensor data interface configured to receive sensor data for determining, particularly in real-time, relative orientations of the multiple links with respect to each other, e.g. wherein the sensor data provide a current setting of a joint associated with two successive links, more specifically velocity information for an angular and/or translational movement of the two consecutive links about their associated joint.

There are multiple ways (real-time) sensor information can be provided. Different types of sensors can be used, e.g. angular or linear encoders, accelerometers, gyroscopes, laser sensors, ultrasound sensors, etc.

In some embodiments, the sensor data may also include position information for determining the position of the excavator with respect to a reference in the environment and/or for determining the position of a target point on one of the multiple links with respect to the reference in the environment. For example, the sensor data may include data of a laser-ranging device and/or coordinate measuring device, e.g. data of a total station or a laser tracker determining, and particularly tracking, the position of a target point on one of the multiple links, e.g. wherein the target point is represented by a cooperative target such as a retroreflective prism or a target ball.

Alternatively, or in addition, the sensor data may include absolute position information for determining an absolute position of the excavator or one of the multiple links with respect to an earth coordinate system, e.g. based on a global navigation satellite system.

In some embodiments, the system comprises a surface setting unit configured to be provided with (to have access to) design data, e.g. computer aided design data, defining a reference surface, wherein the surface setting unit has input means to provide a setting functionality for setting the reference surface.

For example, the system may be configured that the setting functionality comprises a selection functionality with a plurality of predefined options for the setting of the reference surface. Different reference surfaces may already be stored on a storage unit of the system or a user may provide design data defining all or additional reference surfaces to be used for a certain working task. The surface setting unit may also have access to a remote server unit with a database of available design data for different reference surfaces.

In some embodiments, the system comprises a remapping unit configured to remap a user command for moving two of the multiple links with respect to each other about a corresponding joint to an associated rotary tool degree of freedom out of three independent rotary tool degrees of freedom of a movement of the tool with respect to the reference surface. Based on this remapping the remapping unit is configured to coordinate the output signals based on the sensor data, the design data, and an inverse kinematics algorithm, such that as a function of the remapped user command the tool is rotated within the associated rotary tool degree of freedom. In other words, in response to the initial user command for a single joint movement, the tool is rotated within the associated rotary tool degree of freedom based on automatically generated output signals providing a coordinated joint movement. In the absence of other user commands, these output signals are typically configured that an orientation of the tool with respect to the other two rotary tool degrees of freedom is unaffected.

In some embodiments, the system allows an operator to directly adjust the orientation and position of the tool relative to the reference surface, without needing to coordinate the individual underlying joint and cylinder movements. In particular, it allows an intuitive interplay between manual and automatic control of the excavator elements. Furthermore, in the case of semi-automatic control of the excavator elements, the system allows a seamless division of responsibilities between a manual user and an automatic control system, wherein the automatic control system can adjust certain movements relative to the reference surface, and an operator can adjust others, without interfering with each other's task.

Therefore, precision tasks can be easily performed by a non-expert operator. For example, a precision task may require digging in straight lines, wherein for a correctly defined reference surface for this task, the user inputs will directly result in the required straight-line digging.

In some embodiments, the inventive system facilitates the use of a tilt or tilt-rotator articulation. These articulations significantly expand the capabilities of an excavator, but at the cost of increased operating complexity. This is one of the reasons why these articulations are only commonly used in some parts of the world. However, with the inventive system it is straightforward for an operator who is not used to a tilt or tilt-rotator arrangement to benefit from it without significant training.

In some embodiments, in the field of robotics, algorithms for calculating joint movements required to cause a desired tool movement are called Inverse Kinematics.

Such algorithms are based on a set of mathematical relations that describe the relationship between the excavator links, e.g. based on geometrical machine data such as link lengths, joint degrees of freedom, actuator placements, and movement restrictions of individual joints. There are several different general approaches for achieving this, and the invention is not limited to any particular approach.

For example, the remapping unit comprises a model of a particular excavator type, i.e. an algorithm implemented as software on a computer to calculate the individual joint movements required to achieve a particular angular and/or linear movement of the tool relative to the reference surface.

In some embodiments, the system may be configured to process data from an inertial measurement unit comprising accelerometers and gyroscopes, wherein the system is configured to determine relative orientations of the multiple links with respect to each other by a fusion of the data from the accelerometers and the gyroscopes using a state estimation algorithm, particularly a Kalman filter.

By way of example, the remapping unit is configured to remap the user command and to coordinate the output signals based on design data providing the reference surface as one of a plane having a slope defined relative to the gravity vector, wherein the plane is fixed with respect to the ground; a plane having a slope defined relative to the gravity vector, wherein the position of the plane is fixed with respect to a cab swing axis defining a rotation of the cab of the excavator, i.e. wherein the plane position is independent from a rotation of the cab around the cab swing axis but it displaces with the body of the excavator; a plane having a slope defined relative to the gravity vector, wherein the position of the plane is fixed to an orientation of the cab of the excavator around a cab swing axis defining a rotation of the cab, i.e. wherein the plane displaces with the body of the excavator and also rotates with the rotation of the cab; and a surface defined by a 3D model in a geodetic coordinate system.

In some embodiments, the plane may have any slope, e.g. zero slope (so-called horizontal plane) or a slope defined by a particular work plan. In general, a dedicated surface may be defined for a particular working step, e.g. wherein a dedicated surface such as a plane defining a driveway shape is set based on a 3D model, e.g. a CAD model of the worksite. In particular, the system may be configured that an operator can set the slope of the plane.

In some embodiments, the rotatory tool degree of freedom may be defined based on a tool coordinate frame with orthogonal axes that is fixed to the tool. Thus, the rotatory tool degrees of freedom are rotations based on three basic rotations about three orthogonal axes, wherein each basic rotation causes a change in a different component of the axis-angle rotation vector, resolved in the tool coordinate frame, relating the reference coordinate frame to the tool coordinate frame. Alternatively, the rotatory tool degrees of freedom can be described as any combination of the angles in a sequence of three rotations (Euler angles) relating a coordinate frame fixed to the reference surface to the tool coordinate frame.

In some embodiments, the system is configured to move a tool having an attack edge (also called blade or blade edge) dedicated for contacting a surface, e.g. a bucket having a blade embodied as a continuous cutting edge or embodied by individual blade elements (teeth) arranged next to each other, and the three independent rotatory tool degrees of freedom are: a rotation to set an attack angle of the attack edge, a rotation to set a crosscut angle of the attack edge, and a rotation to set a heading angle of the attack edge.

The attack angle, the crosscut angle, and the heading angle are of particular importance when using an excavator with a tilt-rotator arrangement. Typically, the attack angle and the crosscut angles are defined with respect to an orthogonal X, Y, Z coordinate frame that is fixed to the tool, wherein the X axis is parallel to an attack direction of the attack edge, e.g. the digging direction / cutting direction of the blade, and the Y axis is parallel to the attack edge. Then, the attack angle is defined as the angle between the X axis and the reference surface, the crosscut angle is defined as the angle between the Y axis and the reference surface, and the heading angle is defined as the angle of rotation about a normal to the reference surface.

In some embodiments, at least the setting of the attack angle and the crosscut angle with respect to the reference surface are simplified. Thus, the remapping unit is configured to remap at least a further user command for a movement of the multiple links with respect to each other onto one of the three independent rotatory tool degrees of freedom, wherein the above mentioned remapped user command and the remapped further user command are remapped onto the attack angle and the crosscut angle, respectively.

According to a further embodiment, the system has a presetting unit configured to provide for a setting of a target parameter defining the tool orientation within the associated rotatory tool degree of freedom, particularly a target angle and/or a tolerance range for a movement of the tool with respect to the associated rotary tool degree of freedom, and the system is configured to coordinate the output signals such that the tool is oriented based on the target parameter. For example, an operator may manually provide, e.g. over a touch screen, an attack angle of the blade which is then set and automatically maintained by the system.

Typically, the orientation of the tool within the three independent rotatory tool degrees of freedom is settable by a movement of a part of the multiple links about corresponding tool orientation joints. By way of example, in case of a bucket the tool orientation joints may comprise a so-called bucket joint providing "opening/closing" the bucket, a so-called tilt joint providing "left/right" tilting of the bucket, and a so-called roto joint providing rotation of the bucket. In other words, the bucket is rotatable about a rotor axis defined by the roto joint, swiveled about a pitch axis (defined by the bucket joint) perpendicular to the rotor axis, and swiveled about a tilt axis (defined by the tilt joint) perpendicular to the rotor axis and the pitch axis.

In some embodiments, wherein the remapping scheme for operating a bucket is implemented essentially like a standard behavior of manual joint control, the bucket joint, tilt joint, and roto joint are not moved in case non-remapped user inputs are used, e.g. when the boom, stick, or yaw are moved. In other words, the rotatory tool degrees of freedom are unaffected by non-remapped user commands and the rotatory tool degrees of freedom do not change. However, in the presence of remapped user commands, e.g. to change the attack angle, the bucket joint, tilt joint and roto joint will move together in a coordinated way to ensure that the attack angle changes at the desired rate, typically without any change in the crosscut angle or the heading angle.

Accordingly, in a further embodiment, the remapping unit is configured to coordinate the output signals based on a non-remapped user command addressing a movement of two of the multiple links about a corresponding joint which is different from the tool orientation joints, and the remapping unit is configured to coordinate the output signals such that a current orientation of the part of the multiple links about the corresponding tool orientation joints is unaffected by the non-remapped user command.

In some embodiments, the system may also be configured that an enablement state for automatic readjustment of a rotary tool degree of freedom is selectable by a user. The automatically readjusted degrees of freedom are regulated to remain at a preset target value or within a target range by using a feedback control loop. This means that deviations from the target value or range are detected and automatically eliminated by initiating corrective movement. These deviations could be caused by, for example, the movement of other parts of the machine, and/or by movement of the reference surface. In some cases, a particular user input command addressing a particular automatically adjusted degree of freedom may be allowed to cause a change in the corresponding rotary tool degree of freedom without elimination by the feedback control system.

Accordingly, in a further embodiment, the remapping unit has an automatic readjustment functionality configured to coordinate the output signals such that in the absence of the user command for moving the two of the multiple links the movement of the part of the multiple links which sets the orientation of the tool within the three independent rotatory tool degrees of freedom about the corresponding tool orientation joints is automatically controlled such that a current orientation of the tool with respect to the associated rotatory tool degree of freedom is automatically maintained.

In a further embodiment, the system has an automatic stop functionality configured to coordinate the output signals such that a crossing of the reference surface by a point of reference on the tool is automatically prevented.

In addition, some user commands may also be mapped directly to linear degrees of freedom of the tool. Similar to the rotatory degrees of freedom, these linear degrees of freedom are also defined relative to the reference surface and may also be automatically controlled by the system.

Accordingly, in a further embodiment, the remapping unit is configured to remap a user command which is not remapped onto one of the three independent rotatory tool degrees of freedom onto an associated linear tool degree of freedom out of three independent linear tool degrees of freedom of a movement of the tool with respect to the reference surface, wherein the remapping unit is further configured to coordinate the output signals such that as a function of the user command remapped onto the linear tool degree of freedom the tool is moved within the associated linear tool degree of freedom.

By way of example, the three independent linear tool degrees of freedom are a movement of the tool along an axis Z" orthogonal to the reference surface, a movement of the tool along an axis X" parallel to the reference surface, and a movement of the tool along an axis Y" parallel to the reference surface, the axis Y" being orthogonal to the axis X".

By way of another example, the three independent linear tool degrees of freedom are a vertical movement of the tool along the gravity vector, a movement of the tool along an axis X" in the horizontal plane, and a movement of the tool along an axis Y" in the horizontal plane, the axis Y" being perpendicular to the axis X".

In particular, some embodiments of the invention relates to a system for controlling movement of multiple links of an excavator, wherein the excavator comprises: a cab, which is rotatable about a cab swing axis; a boom, which is attached to the cab and can be swiveled with respect to the cab about a boom joint defining a boom axis; a stick, which is attached to the boom and can be swiveled with respect to the boom about a stick joint defining a stick axis; a tilt-rotator arrangement which is attached at the end of the stick; and the tool, which is attached to the tilt-rotator arrangement, wherein the tilt-rotator arrangement is configured that the tool can be rotated about a rotor axis, swiveled about a pitch axis perpendicular to the rotor axis, and swiveled about a tilt axis perpendicular to the rotor axis and the pitch axis.

The remapping unit according to this embodiment is further configured for the following remapping:
- the user command to swivel the boom about the boom axis onto a first of the three independent linear tool degrees of freedom;
- the user command to swivel the stick about the stick axis onto a second of the three independent linear tool degrees of freedom, wherein the second linear tool degree of freedom is different from the first linear tool degree of freedom;
- the user command to rotate the cab about the cab swing axis onto a third of the three linear tool degrees of freedom, wherein the third linear tool degree of freedom is different from the first and the second linear tool degree of freedom;
- the user command to rotate the tool about the rotor axis onto a first of the three independent rotatory tool degrees of freedom;
- the user command to pitch the tool about the pitch axis onto a second of the three independent rotatory tool degrees of freedom, wherein the second rotatory tool degree of freedom is different from the first rotatory tool degree of freedom; and
- the user command to tilt the tool about the tilt axis onto a third of the three independent rotatory tool degrees of freedom, wherein the third rotatory tool degree of freedom is different from the first and the second rotatory tool degree of freedom.

BRIEF DESCRIPTION OF THE DRAWINGS

The system according to the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention.

DETAILED DESCRIPTION

Figure 1:
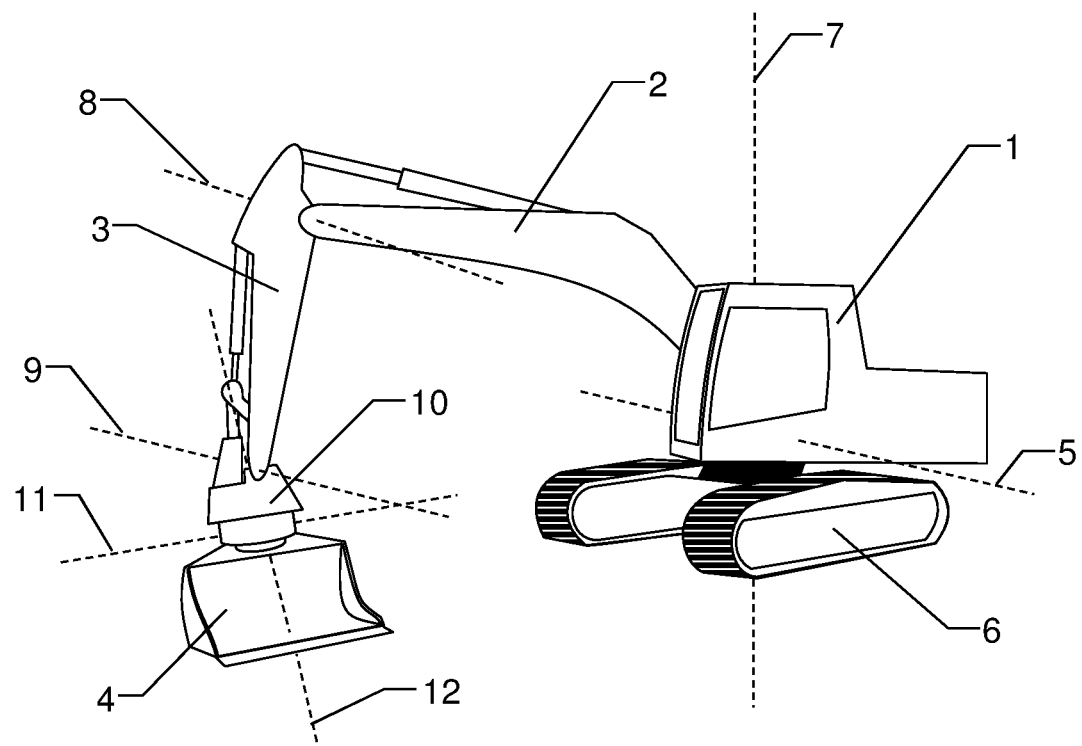
FIG. 1 illustrates the basic components of an excavator having a tilt-rotator arrangement.

FIG. 1 exemplarily shows the basic components of an excavator, i.e. the cab 1, the boom 2, the stick 3, and the tool 4. By way of example, the excavator is embodied as hydraulic excavator.

The (main) boom 2 is the arm element closest to the cab 1. It attaches to the cab 1 via a boom joint, which can be one of several configurations. Here, the boom 2 is configured as a mono boom, wherein the boom joint allows no movement apart from swiveling up and down about a boom axis 5. The cab 1 is arranged on an undercarriage 6, here having tracks, and is rotatable with respect to the undercarriage 6 about 360 degrees about a cab joint defining a cab axis 7.

The stick 3 is attached to the boom via a stick joint so that it can be swiveled about a stick axis 8. The tool 4 is attached at the far end of the stick 3, so that it can be swiveled at least about a tool joint defining a pitch axis 9. In the figure, the excavator further comprises a so-called tilt-rotator arrangement 10 providing a swiveling of the tool 4 about a tilt axis 11 and a 360 degree rotation of the tool 4 about a rotor axis 12.

The use of a tilt-rotator arrangement 10 provides an increased flexibility and precision of the excavator. However, operating an excavator arm having a tilt-rotator arrangement 10 quickly and precisely is a highly skilled task, as the excavator operator needs to constantly assess the impact of the current excavator arm and tool position on the tool movement when coordinating all the individual joint movements.

The Excavator links and joints can vary and there are many different excavator types available, e.g. with dual booms, yaw-able booms, extendible sticks, etc. The invention can be applied to all these different machine types.

Figure 2:
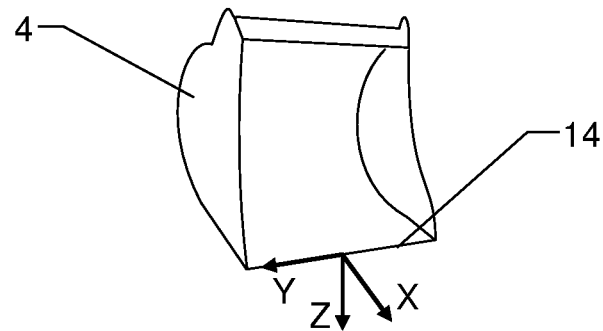
FIG. 2 illustrates an exemplary tool coordinate frame with three orthogonal axes that is fixed to the tool.
Figure 3:
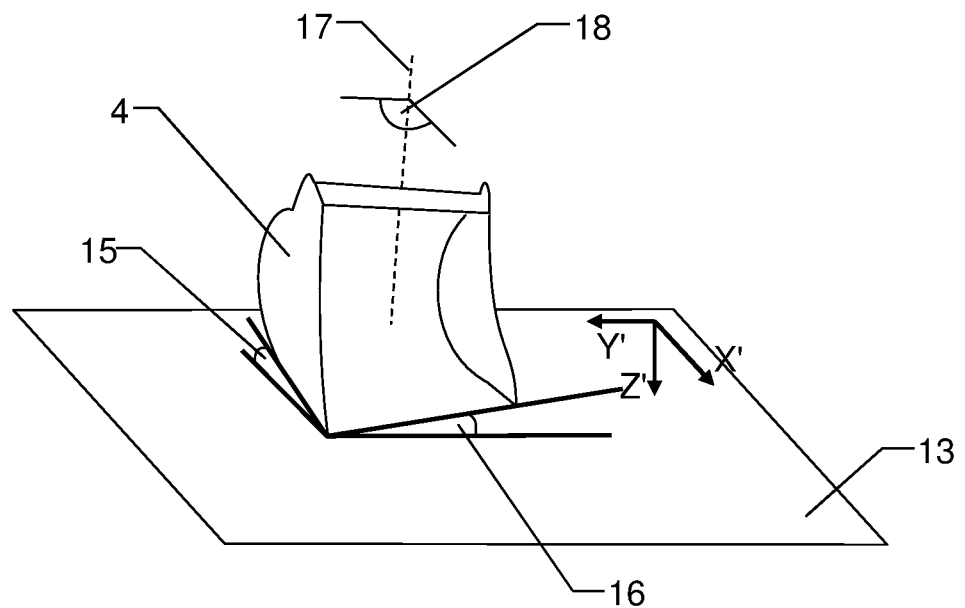
FIG. 3 illustrates an exemplary definition of three independent rotatory tool degrees of freedom for the movement of the tool relative to a reference coordinate frame with three orthogonal axes that is fixed to the reference surface.

FIGS. 2 and 3 show an exemplary definition of three independent rotatory tool degrees of freedom for the movement of the tool 4 relative to a reference surface 13, e.g. an inclined plane.

By way of example, the remapping of the user command is based on a tool coordinate frame with three orthogonal axes X, Y, Z that is fixed to the tool as depicted by FIG. 2, and a reference coordinate frame with three orthogonal axes X', Y', Z' that is fixed to the reference surface 13 as depicted by FIG. 3. Here, the tool 4 is a bucket, which has a continuous blade edge 14, wherein the X axis is parallel to the digging direction of the blade edge 14, and the Y axis is parallel to the blade edge 14.

Based on these coordinate frames, three rotatory tool degrees of freedom relative to the reference surface 13 are then defined: a rotation about the axis that is parallel to the reference surface and perpendicular to X, which causes the angle between the X axis and the reference surface to change, which is also referred to as the attack angle 15; a rotation about the axis that is parallel to the reference surface and perpendicular to Y, which causes the angle between the Y axis and the reference surface to change, which is also referred to as the crosscut angle 16; and a rotation about the normal 17 to the reference surface about a so-called heading angle 18, which causes a change in the heading of the tool 4 relative to the reference surface 13.

Figure 4:
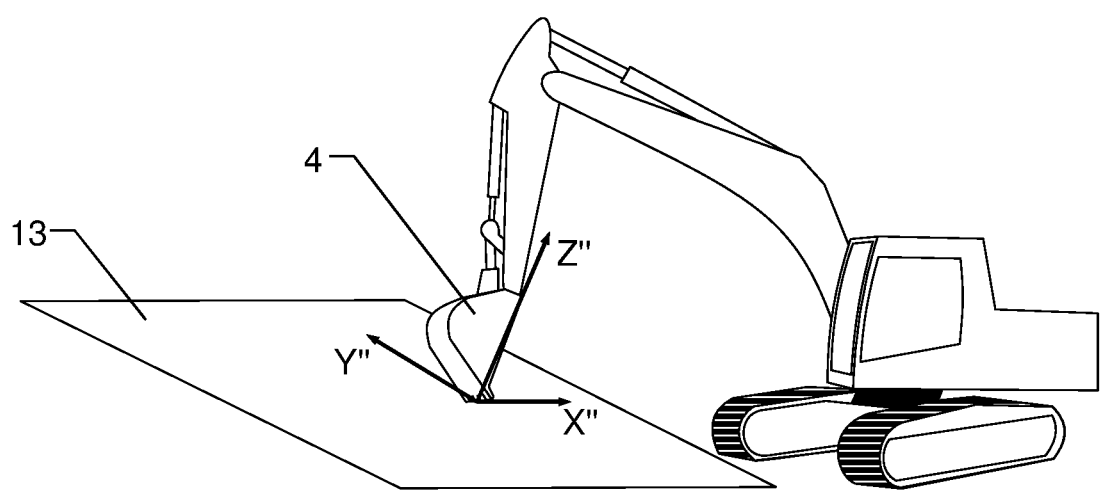
FIG. 4 illustrates an exemplary definition of three different linear tool degrees of freedom for the movement of the tool relative to the reference surface.

FIG. 4 shows an exemplary definition of three independent linear tool degrees of freedom for the movement of the tool 4 relative to the reference surface 13.

By way of example, the three linear tool degrees of freedom are defined as: movement of the tool 4 along an axis Z" orthogonal to the reference surface 13; movement of the tool 4 along an axis X" parallel to the reference surface 13; and movement of the tool 4 along an axis Y" parallel to the reference surface 13, the axis Y" being orthogonal to the axis X".

FIGS. 5 to 9 exemplarily show different remapping schemes for controlling an excavator having a tilt-rotator arrangement, wherein some hand-operated user inputs—by means of two joysticks 19A,19B and two rollers 20A,20B—are remapped from their standard mapping directly to angular and/or linear degrees of freedom (so-called controlled DOFs) of the tool defined relative to an (imaginary) reference surface.

This means that a particular user input degree of freedom (DOF) will cause a change in the corresponding controlled DOF, without affecting the remaining controlled DOFs.

By way of example, the system uses: a calculation unit, e.g. a computer, electronic logic circuit, or microcontroller; an interface to allow reception of the user inputs, e.g. from pressure sensors if the joysticks are hydraulic; sensors that serve to deduce some or all of the joint angles of the excavator arm, e.g. tilt sensors, rotary sensors, and linear sensors; a mathematical kinematic model of the excavator arm used by a software running on the computing unit; and an interface to allow computer-control of some of the excavator joint movements, e.g. a hydraulic interface for converting electrical signals into hydraulic flow or pressure.

Figure 5:
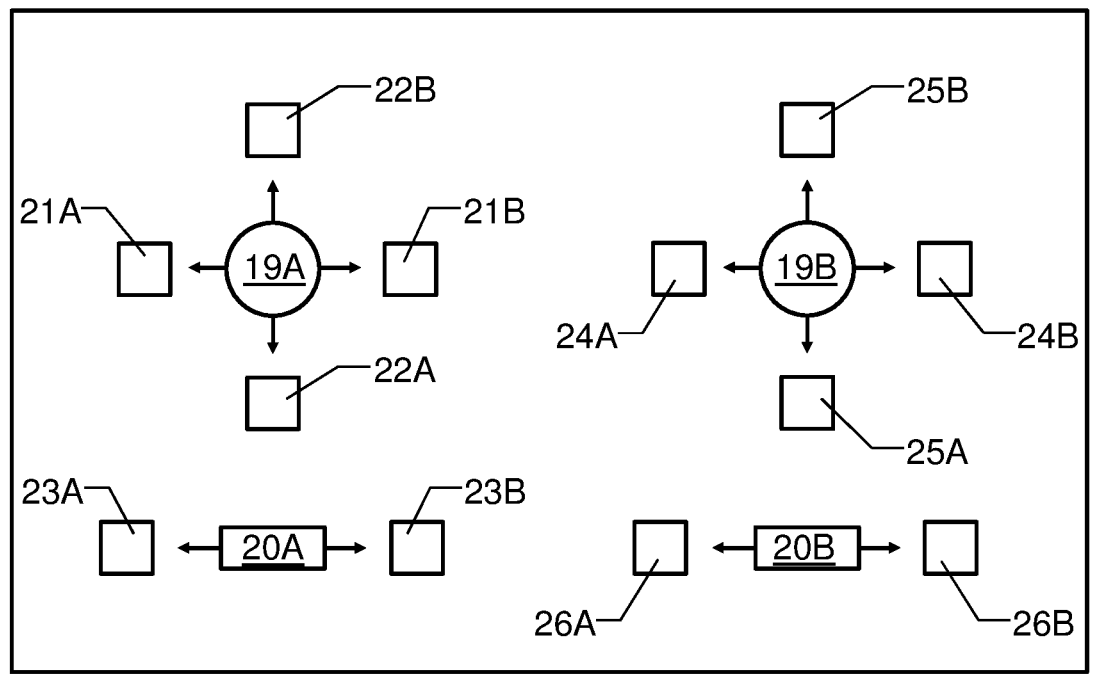
FIG. 5 schematically shows an exemplary mapping arrangement for two joysticks and two rollers according to one embodiment of the invention.

FIG. 5 shows an exemplary mapping scheme for normal operation, i.e. wherein all the individual joint movements are manually coordinated.

By way of example, left/right movement of the left joystick 19A is addressing the cab joint for left 21A and right 21B swing of the excavator arm (rotating the cab 1 around the cab axis 7, see FIG. 1), and back/forth movement of the left joystick 19A is addressing the stick joint for extending 22A and retracting 22B the stick cylinder, i.e. for swiveling the stick 3 around the stick axis 8. Furthermore, the left roller 20A is used for anti-clockwise 23A and clockwise 23B rotation of the tool around the rotor joint, i.e. for rotating the tool 4 around the rotor axis 12. Left/right movement of the right joystick 19B is addressing the tool joint for extending 24A and retracting 24B the tool cylinder, i.e. swiveling the tool 4 around the pitch axis 9, and back and forth movement of the right joystick 19B is addressing the boom joint for extending 25A and retracting 25B the boom cylinder, i.e. for swiveling the boom 2 around the boom axis 5. Moreover, the right roller 20B is used for anti-clockwise 26A and clockwise 26B swiveling of the tool 4 around the tilt axis 11.

Figure 6:
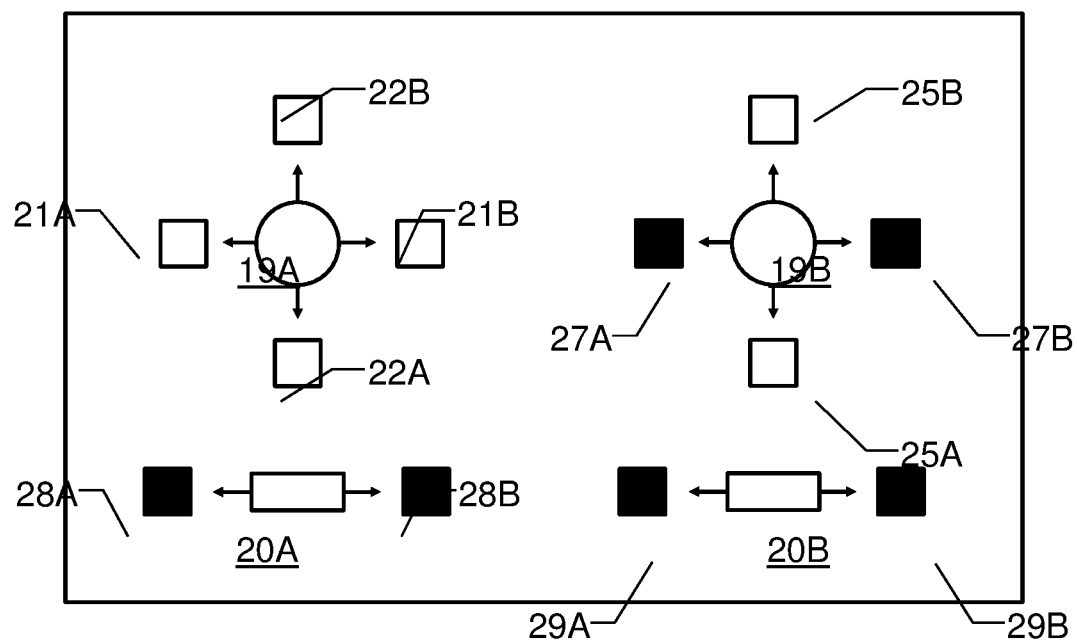
FIG. 6 schematically shows an exemplary remapping for the two joysticks and the two rollers of FIG. 5 onto three independent rotatory degrees of freedom according to one embodiment of the invention.

FIG. 6 shows an exemplary remapping for the two joysticks and the two rollers of FIG. 5 onto three rotatory degrees of freedom according to one embodiment of the invention.

The left/right inputs 24A,24B (FIG. 5) of the right joystick 19B used for swiveling the tool 4 around the pitch axis 9 are remapped onto an increase 27A and decrease 27B of the attack angle 15 (see FIG. 3) of the tool 4 with respect to the reference surface 13. The inputs 23A,23B of the left roller 20A are remapped to a rotation about the normal 17 to the reference surface 13, i.e. an anti-clockwise 28A and clockwise 28B change of the heading angle 18 of the tool (4)

relative to the reference surface 13. Furthermore, the inputs 26A,26B of the right roller 20B are remapped onto an increase 29A and decrease 29B of the crosscut angle 16 of the tool 4 with respect to the reference surface 13.

Figure 7:
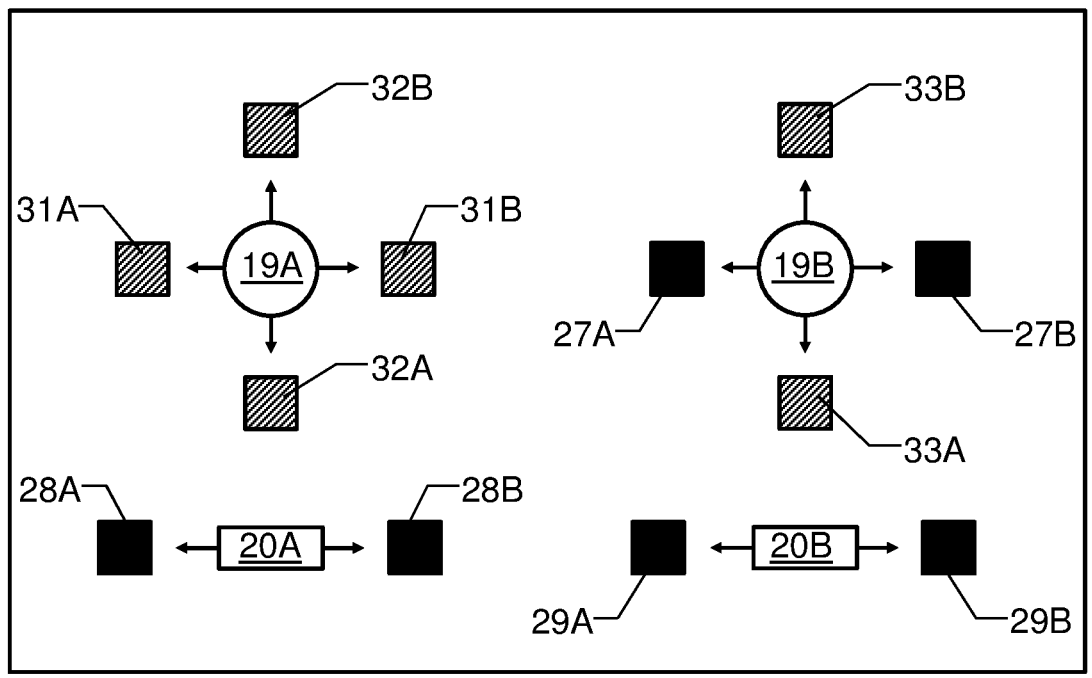
FIG. 7 schematically shows an exemplary remapping for the two joysticks and the two rollers of FIG. 5 onto three independent rotatory degrees of freedom and three independent linear degrees of freedom according to one embodiment of the invention.

FIG. 7 shows an embodiment, wherein the angular remapping of FIG. 6 is further extended by also remapping controller commands of FIG. 5 onto three linear degrees of freedom.

Here, the left/right inputs 21A,21B (FIG. 5) of the left joystick 19A used for left/right swing of the excavator arm are remapped onto a linear left 31A and a linear right 31B movement of the tool 4 along the axis Y" parallel to the reference surface 13 according to FIG. 4. The back/forth movements 22A,22B of the left joystick 19A used for extending/retracting the stick cylinder are remapped onto a linear moving out 32A and a linear moving back 32B of the tool 4 along the axis X" parallel to the reference surface 13 according to FIG. 4. Furthermore, the back/forth movements 25A,25B of the right joystick 19B used for extending/retracting of the boom cylinder are remapped onto a linear decrease 33A and linear increase 33B of the distance of the tool 4 to the reference surface 13 along the normal Z" to the reference surface.

Figure 8:
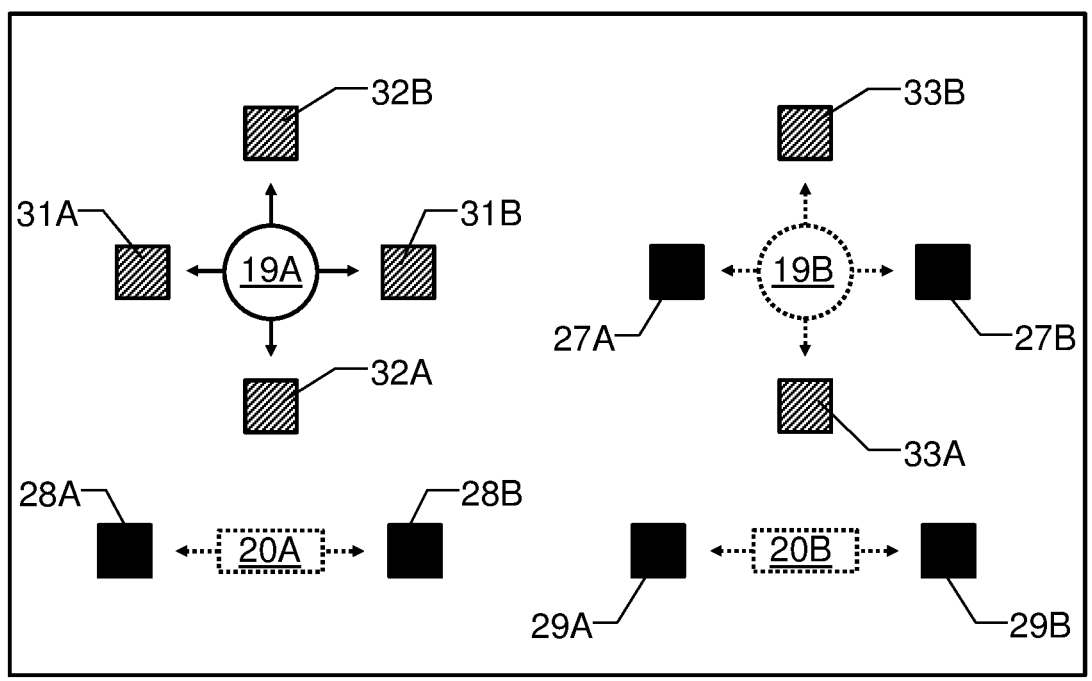
FIG. 8 schematically shows an exemplary remapping for the two joysticks and the two rollers of FIG. 5 with an automatic controlling functionality.

FIG. 8 shows another embodiment of the angular/linear remapping scheme according to FIG. 7, wherein some degrees of freedom are automatically controlled such that previously set values are automatically kept fixed or kept within a certain threshold range, i.e. the operator is not required to use/control the corresponding controls anymore.

Here, the input commands associated with the right joystick 19B and with the two rollers 20A,20B are automatically controlled, i.e. the three rotatory degrees of freedom—attack angle 15, crosscut angle 16, and heading angle 18—as well as the distance of the tool 4 to the reference surface 13.

For example, the system may be configured that after each input by the right joystick 19B or the two rollers 20A,20B the set value is controlled as long as the respective controls are not used anymore. Alternatively, or in addition, the system may be configured for being provided with a target parameter defining a specific setting of the automatically controlled degrees of freedom of the tool, e.g. wherein an operator can manually provide an attack angle (15) over a touch screen, which is then automatically set and maintained by the system.

By way of another example, the system is further configured that an enablement state for the automatic control is selectable by a user.

In all cases, the definition of the reference surface may change during operation in response to user input, e.g. by selecting options with buttons or on a touch screen. Furthermore, there are multiple ways in which the remapping system could be activated, e.g. the remapping could be permanently active or it could only be activated on request, e.g. at the push of a button.

Further combinations of normal mapping, i.e. manual joint control, and rotatory and linear remapping, e.g. also in combination with automatic control, may be implemented. For example (see FIGS. 5-8), left/right movement of the left joystick 19A may correspond to normal operation, e.g. addressing the cab joint for left 21A and right 21B swing of the excavator arm, back/forth movements 22A,22B of the left joystick 19A may be remapped onto linear moving out/back 32A,32B of the tool 4 along the axis X", left/right inputs 24A,24B of the right joystick 19B may be remapped onto an increase/decrease 27A,27B of the attack angle 15, the inputs 23A,23B of the left roller 20A may be remapped to a change of the heading angle 18, the back/forth movements 25A,25B of the right joystick 19B may be remapped onto linear decrease/increase 33A,33B of the distance of the tool 4 to the reference surface 13 along the normal Z", and the inputs 26A,26B of the right roller 20B may be remapped onto an increase/decrease 29A,29B of the crosscut angle 16, wherein the input commands associated with the right roller 20B and the back/forth movements of the right joystick 19B are automatically controlled.

Figure 9:
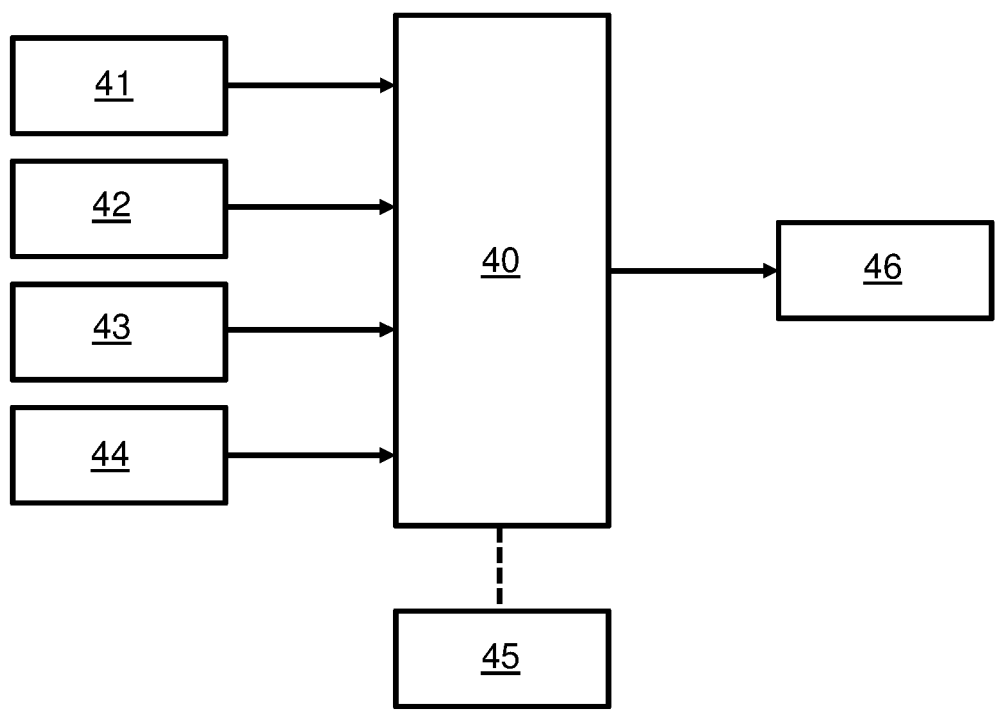
FIG. 9 illustrates a system block diagram with exemplary input and output of the remapping algorithm 40.

FIG. 9 shows a system block diagram, wherein the remapping algorithm 40 is fed by movement input 41 for controlling movement of the excavator, e.g. command signals by means of a joystick. Furthermore, the remapping algorithm 40 is provided with design data 42 defining a reference surface, e.g. based on a 3D model, as well as with raw or processed sensor data 43 describing a current state of the excavator. For example, the sensor data 43 may comprise joint angles, joint rates, linear and/or rotary encoder signals, inclinometer sensor signals, gyroscope sensor signals, laser-ranging data, coordinate measuring data, GNSS receiver signals, etc.

Optionally, a user may provide the remapping algorithm 40 with further user options 44, e.g. a selection of automatically controlled DOFs and/or a selection of target parameters such as target values or movement ranges for automatically controlled DOFs.

The remapping algorithm 40 then makes use of a kinematic model 45 of the excavator type to calculate the individual joint movements required to achieve a particular movement of the tool relative to the reference surface. Based on this, the remapping algorithm 40 provides actuator commands 46 configured to control movement of the excavator links, e.g. control signals comprising actuator positions and actuator velocities, hydraulic command pressures, hydraulic command flows, and electrical currents or voltages.

Purely by way of example, the remapping algorithm 40 may be implemented as follows:

At each discrete time instant, given the current position of the excavator arm, the sensitivity of the controlled rotatory and linear degree of freedom of the tool with respect to the reference surface are calculated, i.e. those degrees of freedom that are mapped to user controls, e.g. caused by joystick movements. Thereby, the rotatory and linear degree of freedom are represented by the vectors $p_{ang}$ and $p_{lin}$, respectively, with respect to the vector of joint angles θ. This sensitivity information is represented by a so-called Jacobian matrix J, such that $$\begin{bmatrix} \Delta p_{ang} \\ \Delta p_{lin} \end{bmatrix} = J\Delta\theta,$$

where Δ indicates a small change. The calculation of the J matrix is straightforward for a person skilled in robotics. The above equation is a system of linear equations. It relates the changes in the controlled DOFs to both the directly manually actuated joint movements and the remapped joint movements. It can be solved for the remapped joint movements using standard methods.

Although the invention is illustrated above, partly with reference to some preferred embodiments, it must be understood that numerous modifications and combinations of different features of the embodiments can be made. For example, different user controls could be used for providing input control commands and other variations for standard input commands and for remapping of these input commands are possible. In particular, any mix of standard input commands of which at least a part is remapped can be used. All of these modifications lie within the scope of the appended claims.

What is claimed is:

1. A system for controlling movement of multiple links of an excavator in order to move a tool arranged at the end of an excavator arm, wherein the tool is attached to a tilt-rotator arrangement, the system comprising:
    an input interface configured to receive input signals carrying user commands for moving at least part of the multiple links with respect to each other about corresponding joints, and
    an output interface configured to provide output signals for multiple actuators controlling the movement of the multiple links,
wherein the system comprises:
    a sensor data interface configured to receive sensor data for determining, particularly in real-time, relative orientations of the multiple links with respect to each other,
    a surface setting unit configured to be provided with design data defining a reference surface, the surface setting unit having input means to provide a setting functionality for setting the reference surface, and
    a remapping unit configured:
        to remap a user command for moving two of the multiple links with respect to each other about a corresponding joint to an associated rotatory tool degree of freedom out of three independent rotatory tool degrees of freedom of a movement of the tool with respect to the reference surface, and
        to coordinate the output signals based on the sensor data, the design data, and an inverse kinematics algorithm, such that as a function of the remapped user command the tool is rotated within the associated rotatory tool degree of freedom.

2. The system according to claim 1, wherein:
    the system is configured to move a tool having an attack edge dedicated for contacting a surface, wherein the three independent rotatory tool degrees of freedom are:
        a rotation to set an attack angle of the attack edge,
        a rotation to set a crosscut angle of the attack edge, and
        a rotation to set a heading angle of the attack edge.

3. The system according to claim 2, wherein:
    the X axis is parallel to an attack direction of the attack edge and the Y axis is parallel to the attack edge, wherein:
        the attack angle is defined as the angle between the X axis and the reference surface,
        the crosscut angle is defined as the angle between the Y axis and the reference surface, and
        the heading angle is defined as the angle of rotation about a normal to the reference surface.

4. The system according to claim 2, wherein the remapping unit is configured to remap at least a further user command for a movement of the multiple links with respect to each other onto one of the three independent rotatory tool degrees of freedom, wherein the remapped user command and the remapped further user command are remapped onto the attack angle and the crosscut angle, respectively.

5. The system according to claim 1, wherein:
    the system has a presetting unit configured to provide for a setting of a target parameter defining the tool orientation within the associated rotatory tool degree of freedom, wherein the setting is a target angle and/or a tolerance range for a movement of the tool with respect to the associated rotary tool degree of freedom, and the system is configured to coordinate the output signals such that the tool is oriented based on the target parameter.

6. The system according to claim 1, wherein the orientation of the tool within the three independent rotatory tool degrees of freedom is settable by a movement of a part of the multiple links about corresponding tool orientation joints, wherein:
    the remapping unit is configured to coordinate the output signals based on a non-remapped user command addressing a movement of two of the multiple links about a corresponding joint which is different from the tool orientation joints, and
    the remapping unit is configured to coordinate the output signals such that a current orientation of the part of the multiple links about the corresponding tool orientation joints is unaffected by the non-remapped user command.

7. The system according to claim 1, wherein the orientation of the tool within the three independent rotatory tool degrees of freedom is settable by a movement of a part of the multiple links about corresponding tool orientation joints, wherein the remapping unit has an automatic readjustment functionality configured to coordinate the output signals such that in the absence of the user command for moving the two of the multiple links the movement of the part of the multiple links about the corresponding tool orientation joints is automatically controlled such that a current orientation of the tool with respect to the associated rotatory tool degree of freedom is automatically maintained.

8. The system according to claim 1, wherein the system has an automatic stop functionality configured to coordinate the output signals such that a crossing of the reference surface by a point of reference on the tool is automatically prevented.

9. The system according to claim 1, wherein the remapping unit is configured to remap the user command and to coordinate the output signals based on design data providing the reference surface as one of:
    a plane having a slope defined relative to the gravity vector, wherein the plane is fixed with respect to the ground,
    a plane having a slope defined relative to the gravity vector, wherein the position of the plane is fixed with respect to a cab swing axis defining a rotation of the cab of the excavator,
    a plane having a slope defined relative to the gravity vector, wherein the position of the plane is fixed to an orientation of the cab of the excavator around a cab swing axis defining a rotation of the cab, and
    a surface defined by a 3D model in a geodetic coordinate system.

10. The system according to claim 1, wherein the setting functionality comprises a selection functionality with a plurality of predefined options for the setting of the reference surface.

11. The system according to claim 1, wherein the remapping unit is configured:
    to remap a user command which is not remapped onto one of the three independent rotatory tool degrees of freedom onto an associated linear tool degree of freedom out of three independent linear tool degrees of freedom of a movement of the tool with respect to the reference surface, and
    to coordinate the output signals such that as a function of the user command remapped onto the linear tool degree of freedom the tool is moved within the associated linear tool degree of freedom.

12. The system according to claim 11, wherein the three independent linear tool degrees of freedom are:
- a movement of the tool along an axis Z" orthogonal to the reference surface,
- a movement of the tool along an axis X" parallel to the reference surface, and
- a movement of the tool along an axis Y" parallel to the reference surface, the axis Y" being orthogonal to the axis X".

13. The system according to claim 11, wherein the three independent linear tool degrees of freedom are:
- a vertical movement of the tool along the gravity vector,
- a movement of the tool along an axis X" in the horizontal plane, and
- a movement of the tool along an axis Y" in the horizontal plane, the axis Y" being perpendicular to the axis X".

14. The system according to claim 1, wherein the excavator comprises:
- a cab, which is rotatable about a cab swing axis,
- a boom, which is attached to the cab and can be swiveled with respect to the cab about a boom joint defining a boom axis,
- a stick, which is attached to the boom and can be swiveled with respect to the boom about a stick joint defining a stick axis,
- a tilt-rotator arrangement which is attached at the end of the stick, and
- the tool, which is attached to the tilt-rotator arrangement, wherein the tilt-rotator arrangement is configured that the tool can be rotated about a rotor axis, swiveled about a pitch axis perpendicular to the rotor axis, and swiveled about a tilt axis perpendicular to the rotor axis and the pitch axis, wherein the remapping unit is configured to remap:
- the user command to swivel the boom about the boom axis onto a first of the three independent linear tool degrees of freedom,
- the user command to swivel the stick about the stick axis onto a second of the three independent linear tool degrees of freedom, wherein the second linear tool degree of freedom is different from the first linear tool degree of freedom,
- the user command to rotate the cab about the cab swing axis onto a third of the three linear tool degrees of freedom, wherein the third linear tool degree of freedom is different from the first and the second linear tool degree of freedom,
- the user command to rotate the tool about the rotor axis onto a first of the three independent rotatory tool degrees of freedom,
- the user command to pitch the tool about the pitch axis onto a second of the three independent rotatory tool degrees of freedom, wherein the second rotatory tool degree of freedom is different from the first rotatory tool degree of freedom, and
- the user command to tilt the tool about the tilt axis onto a third of the three independent rotatory tool degree of freedom, wherein the third rotatory tool degree of freedom is different from the first and the second rotatory tool degree of freedom.

15. The system according to claim 1, wherein the system is configured to process data from an inertial measurement unit comprising accelerometers and gyroscopes, wherein the system is configured to determine relative orientations of the multiple links with respect to each other by a fusion of the data from the accelerometers and the gyroscopes using a state estimation algorithm.

16. The system according to claim 15, wherein the state estimate algorithm is a Kalman filter.

* * * * *